B. T. EPPS.
GEAR SHIFTING AND BRAKE APPLYING MECHANISM.
APPLICATION FILED DEC. 4, 1909.
996,572.
Patented June 27, 1911.
2 SHEETS—SHEET 2.
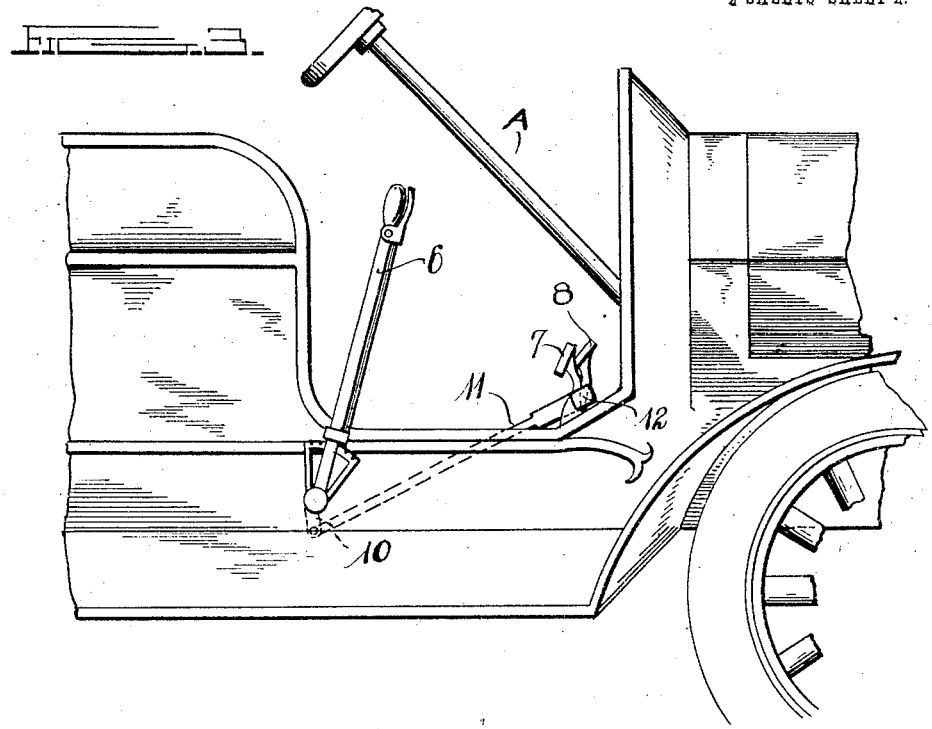
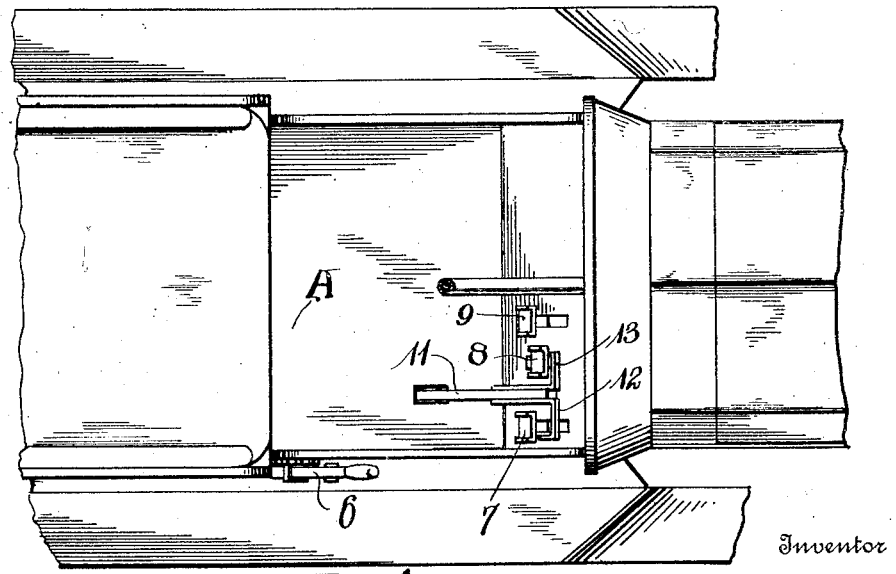
Witnesses
Ernest Crocker
Henry T. Bright
Inventor
Benjamin T. Epps.
By Chandlee & Chandlee
Attorneys

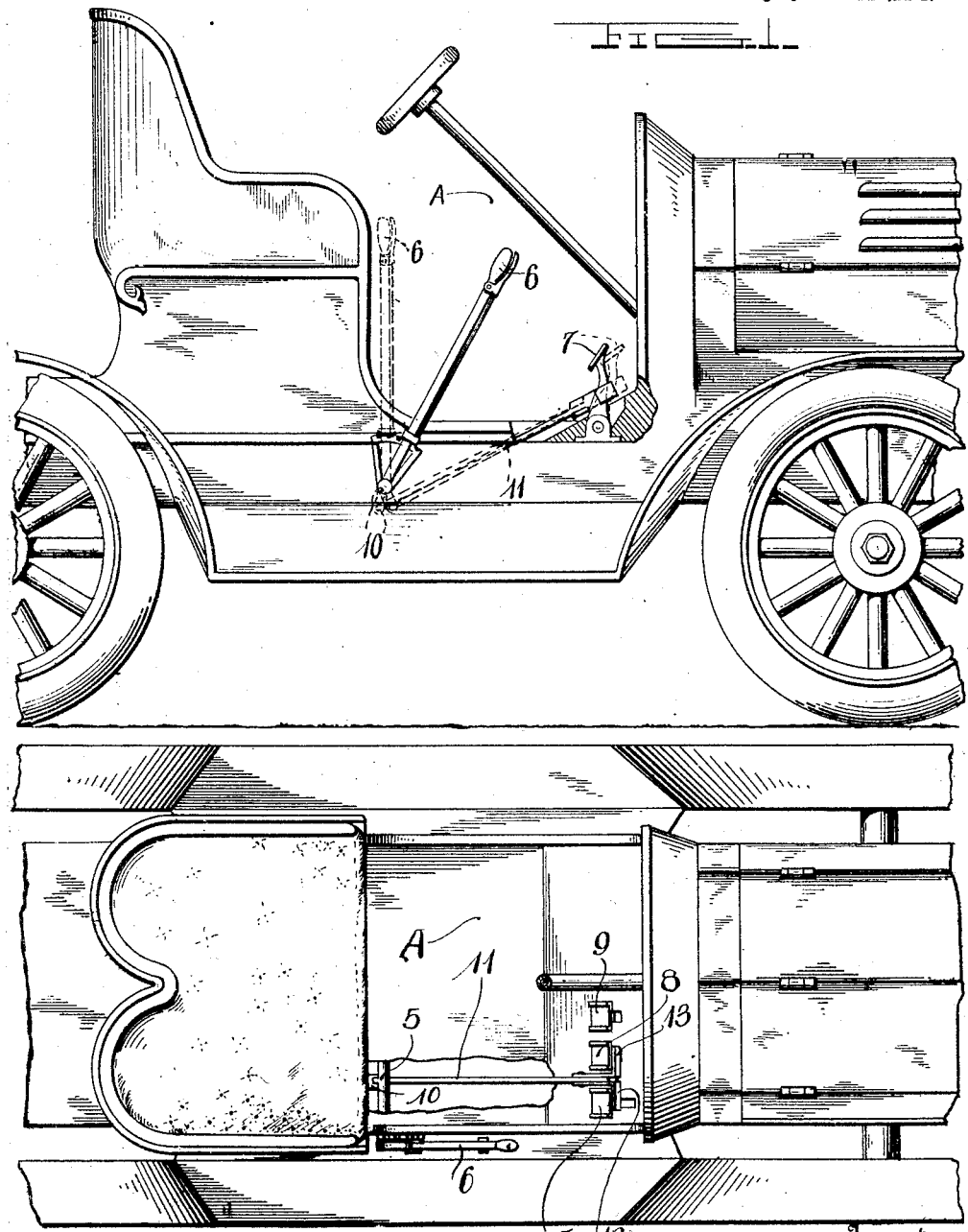

UNITED STATES PATENT OFFICE.

BENJAMIN T. EPPS, OF ATHENS, GEORGIA.

GEAR-SHIFTING AND BRAKE-APPLYING MECHANISM.

996,572.

Specification of Letters Patent. Patented June 27, 1911.

Application filed December 4, 1909. Serial No. 531,372.

*To all whom it may concern:*

Be it known that I, BENJAMIN T. EPPS, a citizen of the United States, residing at Athens, in the county of Clarke, State of Georgia, have invented certain new and useful Improvements in Gear-Shifting and Brake-Applying Mechanism; and I do hereby declare the following to be a full, clear, and exact description of the invention, such as will enable others skilled in the art to which it appertains to make and use the same.

This invention relates to gear shifting and brake applying mechanism for motor vehicles.

Heretofore when it is desired to change the speed of the vehicle from high gear to low gear, or to operate the brake it has always been necessary to first throw out the high gear by operating a hand lever adjacent the driver's seat previous to changing the gear or actuating the braking mechanism through the instrumentality of the low speed pedal and the brake pedal respectively.

It is the object of this invention to so connect the high gear clutch mechanism and the low gear pedal that the throwing out of the high gear and the application of the low gear is accomplished by the actuation of the low pedal without recourse to the high gear hand lever, the initial movements of said low pedal serving to throw out the high gear and the final movements throwing in the low gear.

A further object of the invention is to likewise so connect the high gear clutch mechanism and the brake pedal that the initial movements of the brake pedal will throw out the high gear while its final movement will apply the brake.

With the above and other objects in view the invention consists in the details of construction and in the arrangement and combination of parts to be hereinafter more fully described and set forth in the claims.

In describing the invention in detail reference will be had to the accompanying drawings in which like characters denote corresponding parts in the several views and in which, Figure 1 is a side elevation of a motor vehicle with the invention incorporated, certain portions of same being broken away, and the hand lever for operating the clutch mechanism shown in full lines in the position same occupies when the machine is in high gear and in dotted lines in the position occupied when the high gear is thrown out by the hand lever. Fig. 2, a top plan view of what is shown in Fig. 1, a portion of the floor of the vehicle being broken away so as to show the connection between the high speed clutch mechanism and the low gear and brake pedal; Fig. 3, a view similar to Fig. 1 showing the position of the operating lever of the high gear clutch mechanism when the low gear pedal is operated; and, Fig. 4, a top plan view of what is shown in Fig. 3.

Referring to the drawings A represents a motor vehicle provided with the usual high speed clutch operating shaft 5 which carries at its end the hand lever 6; the movement of said lever in a forwardly direction serving to rotate said shaft to throw in the high speed clutch and its movement in a rearward direction serving to throw out said clutch. Projecting through the flooring of the vehicle is the usual brake pedal 7, slow speed pedal 8 and emergency brake pedal 9, which are adapted by their actuation to operate the mechanisms to which they are connected. Projecting from the shaft 5 is a short arm 10 to the free end of which is pivoted one end of a link 11, the other end of which has secured thereto a pair of oppositely disposed, hook shaped members 12 and 13, the member 12 extending forward of and embracing the brake pedal 7, and the member 13 likewise extending forward of and embracing the slow speed pedal 8.

The operation of the mechanism just described is as follows:—Assuming the parts to be in the position shown in Fig. 1, in full lines with the hand lever 6 disposed forwardly and the machine in high gear, it is only necessary in order to throw out the high and apply the low to move the pedal 8 forwardly its full extent. This forward movement of the pedal 8 will because of the engagement of the member 13 therewith draw the link 11 forwardly and thus produce a rotation of the shaft 5 through the medium of the short arm 10. The hand lever 6 during this operation will be returned to the position shown in Fig. 3, and the high gear will be thrown out and immediately subsequent to the throwing out of the high gear which is accomplished by the initial movement of the brake 8 the low gear will be thrown in and thus the change from a high to a low gear effected without any manual operation of the lever 6. It will be noted, however, that the movement of the pedal 8 is not sufficient to return the hand lever 6 to the position shown in dotted lines in Fig. 1, and therefore the shaft 5 is not rotated a sufficient distance to lock the clutch spring and it will follow that as soon as the pedal 8 is released the low gear will be thrown out automatically in the usual manner and the high gear will likewise be thrown in automatically under the influence of the clutch spring.

When it is desired to apply the brake to the machine when same is traveling in high gear, without manually operating the hand lever 6 it is only necessary to move the pedal 7 with the foot, which movement by reason of the engagement of the pedal 9 with the member 12 will cause the link 11 to rotate the shaft 5 and throw out the high gear, such movement of the pedal serving at the same time to apply the brake in the usual manner. As the length of movement that can be imparted to the pedal 7 is greater than that which can be imparted to the pedal 8 by reason of the difference in length of the slots in which they travel, a complete movement of the pedal 7 will return the hand lever 6 and the shaft 5 to the position shown in Fig. 1, and thus lock the clutch spring against again throwing in the high gear when the brake pedal 7 is released.

While the difference in movement imparted to the shaft 5 and the lever 6 by the movement of the pedals 7 and 8 is accomplished by the difference in length of the slots in which said pedals travel it will be perfectly obvious that the same result could be reached by constructing said pedals capable of the same extent of movement and positioning the member 13 a greater distance forward of the pedal 8 than the member 12 is positioned with respect to the pedal 7.

From the foregoing description it will be apparent that a very simple and effective mechanism is produced for dispensing with the manual operation of the hand lever of the high gear clutch mechanism when either the low gear or the brake is applied and while I have shown one particular form for carrying the invention into practice it will be obvious that many detail changes may be instituted without departing from the scope of the invention.

What is claimed is:—

1. In a motor vehicle, the combination with a rotatable shaft for controlling the high gear clutch, an arm on said shaft, a pair of pedal levers for controlling the low gear clutch and the brake mechanism respectively, and a link having one end connected with the arm on said shaft, and the other end adapted for engagement with said pedal levers during the movement of the latter in one direction, whereby the movement of one of said pedal levers in one direction will successively rotate said shaft to cause same to throw out the high gear clutch and then throw in the low gear clutch, and the movement of the other pedal lever in said direction will successively rotate said shaft to cause same to throw out the high gear clutch and then actuate the brake mechanism.

2. In a motor vehicle, the combination with a rotatable shaft for controlling the high gear clutch, an arm on said shaft, a pair of pedal levers for controlling the low gear clutch and the brake mechanism respectively, a link having one end pivotally connected with the arm on said shaft, and the other end supported by the body of the vehicle between said pedals and provided with oppositely disposed lateral projections extending across the path of travel of said pedal levers respectively, whereby the movement of one of said pedal levers in one direction will successively rotate said shaft to cause same to throw out the high gear clutch and then throw in the low gear clutch, and the movement of the other pedal lever in said direction will successively rotate said shaft to cause same to throw out the high gear clutch and then actuate the brake mechanism.

In testimony whereof, I affix my signature, in presence of two witnesses.

BENJAMIN T. EPPS.

Witnesses:
CARLISLE COBB,
M. E. BALDWIN.